United States Patent
Deurloo

(10) Patent No.: US 7,673,695 B2
(45) Date of Patent: Mar. 9, 2010

(54) DRY PIPE/DELUGE VALVE FOR AUTOMATIC SPRINKLER SYSTEMS

(75) Inventor: David Deurloo, Easley, SC (US)

(73) Assignee: The Reliable Automatic Sprinkler Co., Inc., Mount Vernon, NY (US)

( * ) Notice: Subject to any disclaimer, the term of this patent is extended or adjusted under 35 U.S.C. 154(b) by 355 days.

(21) Appl. No.: 11/445,740

(22) Filed: Jun. 2, 2006

(65) Prior Publication Data
US 2007/0295518 A1    Dec. 27, 2007

(51) Int. Cl.
A62C 35/00    (2006.01)

(52) U.S. Cl. .............................. 169/17; 169/22; 169/19; 137/527.4

(58) Field of Classification Search .................... 169/17, 169/22; 137/527, 527.8, 516.25, 516.29, 137/556
See application file for complete search history.

(56) References Cited

U.S. PATENT DOCUMENTS

| | | | |
|---|---|---|---|
| 440,100 A | 11/1890 | Clapp | |
| 914,883 A | 3/1909 | Rockwood | |
| 1,464,244 A | 8/1923 | Drake | |
| 1,464,926 A | 8/1923 | Eastwood | |
| 1,505,958 A | 8/1924 | Huntting | |
| 1,600,468 A | 9/1926 | Hennebohle | |
| 1,662,839 A | 3/1928 | Tyden | |
| 1,790,467 A | 1/1931 | Griffith | |
| 1,856,333 A * | 5/1932 | Hodgman, Jr. ................ | 169/22 |
| 1,900,632 A | 3/1933 | Boardman | |
| 1,911,107 A * | 5/1933 | Carter .......................... | 169/22 |
| 1,913,027 A | 6/1933 | Griffith | |
| 1,932,324 A | 10/1933 | Rowley | |
| 1,933,214 A | 10/1933 | Halford | |
| 1,941,694 A | 1/1934 | Kilgour | |
| 1,941,695 A | 1/1934 | Kilgour | |
| 1,947,309 A | 2/1934 | Rowley | |
| 1,976,022 A | 10/1934 | Hutchinson | |

(Continued)

FOREIGN PATENT DOCUMENTS

JP    55063066    5/1980

(Continued)

Primary Examiner—Dinh Q Nguyen
(74) Attorney, Agent, or Firm—Fitzpatrick, Cella, Harper & Scinto

(57) ABSTRACT

A dry/deluge valve for an automatic sprinkler system. The valve includes a main chamber having an input port for receiving fluid from a supply line and an output port. A clapper assembly is installed in the main chamber for sealing the input port. The clapper assembly includes a threaded valve seat configured to be screwed into a wall of the main chamber, so as to be in communication with the input port. The assembly further includes a collar configured to receive the valve seat, wherein the collar is held in position by the valve seat. A clapper configured to seal the input port, in cooperation with the valve seat, is hinged to the collar, and a lever also is hinged to the collar and is movable between a first position in which the clapper is held closed by the lever and a second position in which the clapper is allowed to open. The dry pipe/deluge valve further includes a sensing chamber having components responsive to a control pressure of the sensing chamber, the components being in communication with the lever to move the lever between the first position and the second position.

18 Claims, 7 Drawing Sheets

U.S. PATENT DOCUMENTS

| | | | |
|---|---|---|---|
| 2,003,884 | A | 6/1935 | Halford |
| 2,099,069 | A | 11/1937 | Lowe et al. |
| 2,266,421 | A | 12/1941 | Griffith |
| 2,290,358 | A | 7/1942 | Rider |
| 2,357,133 | A | 8/1944 | Rider |
| 2,384,342 | A | 9/1945 | Rider |
| 2,389,817 | A | 11/1945 | Rider |
| 2,398,461 | A | 4/1946 | Rider |
| 2,400,372 | A | 5/1946 | Rider |
| 2,447,174 | A | 8/1948 | Griffith |
| 2,469,831 | A | 5/1949 | Lewis |
| 2,475,489 | A | 7/1949 | Gathercoal |
| 2,505,761 | A | 5/1950 | Gieseler |
| 2,506,468 | A | 5/1950 | Rider |
| 2,597,474 | A | 5/1952 | Griffith |
| 2,713,916 | A | 7/1955 | Muckenfuss |
| 2,717,001 | A * | 9/1955 | Perrault ............ 137/514 |
| 3,075,547 | A | 1/1963 | Scaramucci |
| 3,307,633 | A * | 3/1967 | Newall ............ 169/22 |
| 3,315,748 | A | 4/1967 | Merdinyan et al. |
| 3,331,391 | A | 7/1967 | Merdinyan |
| 3,447,609 | A | 6/1969 | Harvey |
| 3,595,318 | A | 7/1971 | Merdinyan |
| 3,883,111 | A | 5/1975 | Jourdan |
| 4,367,861 | A | 1/1983 | Bray et al. |
| 4,552,221 | A | 11/1985 | Klein |
| 4,854,342 | A | 8/1989 | Polan |
| 5,143,112 | A * | 9/1992 | Scaramucci ............ 137/315.01 |
| 5,295,503 | A | 3/1994 | Meyer et al. |
| 5,439,028 | A | 8/1995 | Meyer et al. |
| 5,992,532 | A | 11/1999 | Ramsey et al. |
| 6,000,473 | A | 12/1999 | Reilly |
| 6,029,749 | A | 2/2000 | Reilly et al. |
| 6,068,057 | A | 5/2000 | Beukema |
| 6,557,645 | B1 | 5/2003 | Ringer |
| 6,578,602 | B1 | 6/2003 | Kirschner |
| 6,666,277 | B2 | 12/2003 | Reilly |
| 6,810,963 | B2 | 11/2004 | Ringer |
| 7,104,333 | B2 | 9/2006 | Ringer |
| 2005/0155777 | A1 | 7/2005 | Reilly et al. |
| 2006/0081292 | A1 | 4/2006 | Sarno et al. |
| 2006/0096763 | A1 | 5/2006 | Ringer |

FOREIGN PATENT DOCUMENTS

| | | |
|---|---|---|
| JP | 2002065885 | 3/2002 |
| JP | 2003275335 | 9/2003 |

* cited by examiner

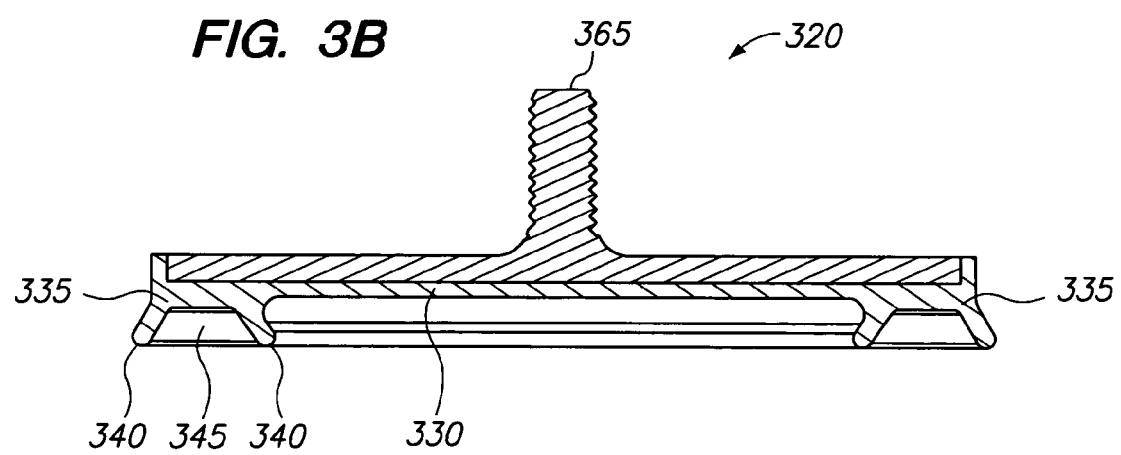

DRY PIPE/DELUGE VALVE FOR AUTOMATIC SPRINKLER SYSTEMS

BACKGROUND OF THE INVENTION

1. Field of the Invention

The present invention relates to a dry pipe/deluge valve for automatic fire protection sprinkler systems, and in particular a hydraulically-operated valve for use as a primary control valve in a dry pilot, deluge, preaction, or other special types of fire protection systems.

2. Related Art

A conventional fire protection system includes automatic sprinklers connected to a conduit to receive pressurized fire-extinguishing fluid, such as water. Such systems are referred to as "wet pipe" systems. A typical sprinkler has a base with a threaded portion for connection to the conduit and an output orifice to output the fluid to provide fire control and/or suppression. The output orifice is sealed by a seal cap, which is held in place by a release mechanism. The release mechanism is designed to release the cap under predetermined conditions, thereby initiating the flow of fire-extinguishing fluid. A typical release mechanism includes a thermally-responsive element, e.g., a frangible bulb or fusible link, and may also include a latching mechanism.

Certain fire protection systems have a central valve, referred to as a "dry pipe valve" or "deluge valve," that controls the flow of fire extinguishing fluid from a high pressure supply input to a system output connected to the sprinkler conduits. A typical dry pipe valve has a main chamber for controlling fluid flow from the supply input to the system output. The valve also has a secondary, i.e., "sensing" chamber, to which a fluid-based control line is connected. The valve maintains a balance (i.e., a pressure differential) between the pressure in the sensing chamber and the pressure in the fluid supply input line, which is sealed with a cover (referred to as a "clapper") in the main chamber. A pressure drop in the sensing chamber below a certain threshold allows the clapper to be forced open by the pressure in the supply line, thereby initiating the flow of fluid through the main chamber to the sprinkler system output.

In dry pipe valve systems, the sprinkler conduits initially act as "pilot" lines, which means that the water in these conduits (in a "wet pilot" system) serves as a means for detecting a fire condition, rather than as a means of extinguishing a fire. In such a system, the pilot lines are connected to the sensing chamber of the dry pipe valve. When a sprinkler is activated under fire conditions, the resulting drop in water pressure in the pilot lines (and sensing chamber) triggers the dry pipe valve to initiate the flow of fire-extinguishing fluid to the sprinklers. The sprinklers on the wet pilot lines (or on a separate set of conduits) then act to extinguish the fire.

A "dry pilot" system may be used in applications in which wet pilot lines are not suitable, such as for refrigerated or sub-freezing storage. Dry pilot systems contain pressurized air or other gases, such as nitrogen, in the conduits connected to the sprinklers, rather than water. When a sprinkler is activated under fire conditions, the resulting drop in air pressure in the pilot lines triggers an actuator (which is usually a separate component from the valve), which in turn releases the water pressure in the sensing chamber. This causes the valve to open, as described above, and initiates the flow of fire-extinguishing fluid to the sprinklers.

Electrically-actuated systems employ a solenoid valve that is triggered by electronic fire or smoke detection devices or other types of electrical control devices. The solenoid may be connected in series with a wet or dry pilot system. For example, in a "preaction" system, a loss of pressure in the pilot lines initiates an alarm, but the system does not open the central valve until the solenoid is electrically-actuated, e.g., by an electrical signal from a smoke detection system. Such systems may be used in sensitive areas, such as computer facilities, in which inadvertent activation of the sprinklers would cause significant damage.

SUMMARY OF THE INVENTION

In one aspect, the present invention provides a dry/deluge valve for an automatic sprinkler system. The valve includes a main chamber having an input port for receiving fluid from a supply line and an output port. A clapper assembly is installed in the main chamber for sealing the input port. The clapper assembly includes a threaded valve seat configured to be screwed into a wall of the main chamber, so as to be in communication with the input port. The assembly further includes a collar configured to receive the valve seat, wherein the collar is held in position by the valve seat. A clapper configured to seal the input port, in cooperation with the valve seat, is hinged to the collar, and a lever also is hinged to the collar and is movable between a first position in which the clapper is held closed by the lever and a second position in which the clapper is allowed to open. The dry pipe/deluge valve further includes a sensing chamber having components responsive to a control pressure of the sensing chamber, the components being in communication with the lever to move the lever between the first position and the second position.

Embodiments of the present invention may include one or more of the following features.

The input and output ports may be sized to have a thicker portion at an end thereof to allow the valve to be machined to any pipe size selected from the group consisting of: 2 inches, 2.5 inches, 3 inches, and 76 mm. The input and output ports may have a nominal size of 8 inches.

The lever may have an extended portion that tends to rotate the lever toward the clapper. The extended portion of the lever, in the first position, may contact an upper edge of the clapper to prevent the clapper from opening or may contact a lower edge of the clapper to prevent the clapper from re-seating.

The clapper may be hinged to the collar using a rod that extends through an edge of the clapper and through support portions that extend from the collar. The collar may form a slip fit with the valve seat, such that an upper lip of the valve seat rests on a surface of the collar.

The valve seat may include an upper rim having a circumferential canal. The upper rim may have holes that lead through an interior of the valve seat to corresponding alarm output ports on an outer surface of the valve seat.

The clapper assembly may include a sealing disk removably attached to an underside of the clapper, so as to engage with the valve seat when the clapper is closed. The sealing disk may include a metal disk having a seal formed on a surface thereof and at least one threaded post extending from a central portion of an opposite surface. The sealing disk may have three threaded posts extending from the central portion of the surface opposite the seal surface. The seal may be formed of a layer of rubber that is vulcanized to the metal disk. The seal may have a circumferential portion with edges that form a concave rim around the disk.

The sensing chamber may include a control input port for receiving fluid from a control supply and a control output port. A piston may be provided that is responsive to a fluid pressure in the sensing chamber. A push-rod may be in communication with the piston and may extend into the main chamber and abut the lever to hold the lever in the first position. The sensing chamber may further include a diaphragm positioned between the fluid in the sensing chamber and the piston.

These and other objects, features and advantages will be apparent from the following description of the preferred embodiments of the present invention.

BRIEF DESCRIPTION OF THE DRAWINGS

The present invention will be more readily understood from a detailed description of the preferred embodiments taken in conjunction with the following figures.

FIG. 3B is a sectional view of a sealing disk for inside of the clapper.

DETAILED DESCRIPTION OF THE PREFERRED EMBODIMENTS

Figure 1:
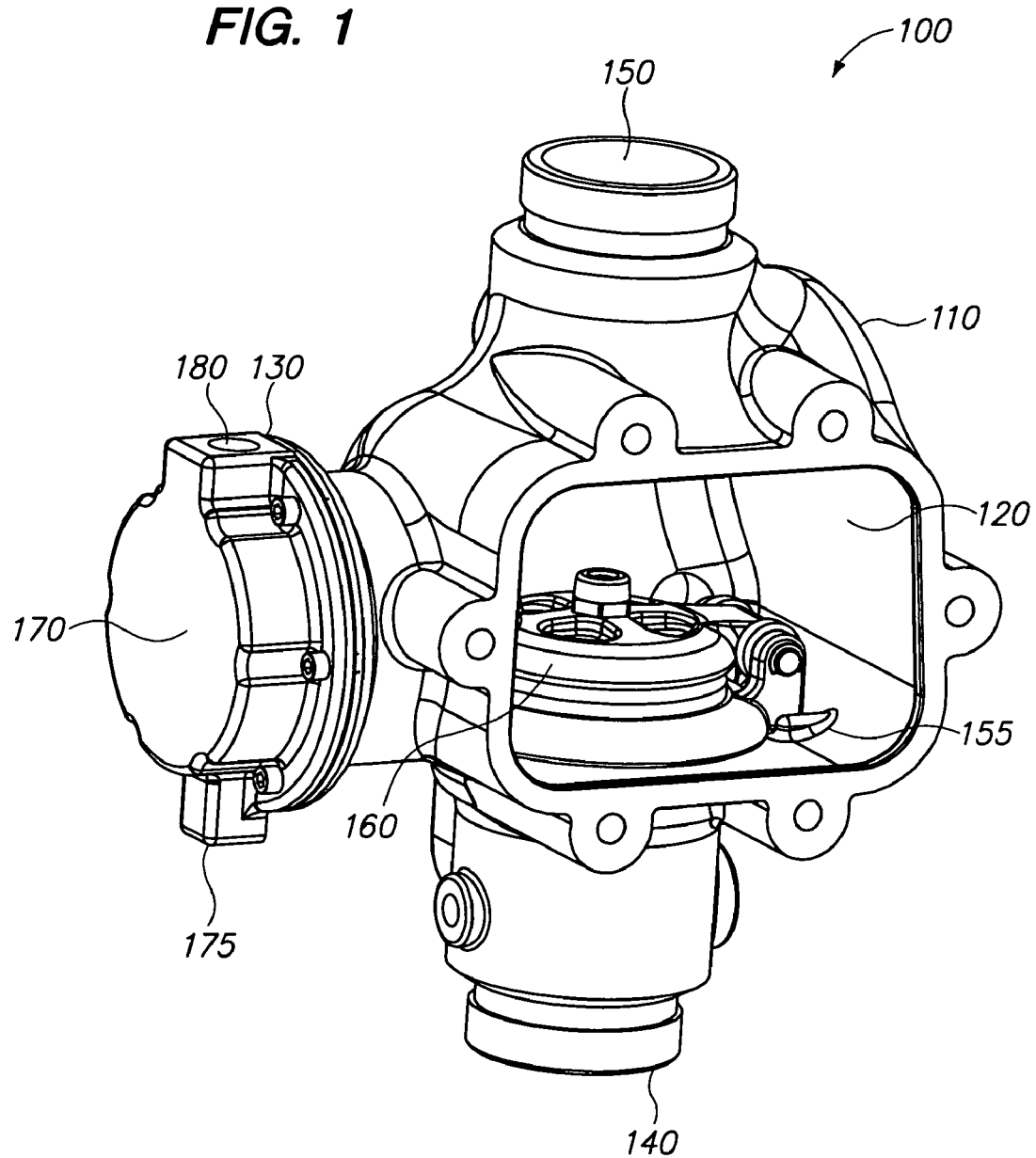
FIG. 1 is a perspective view of a dry pipe/deluge valve for an automatic sprinkler system, in accordance with the present invention.

FIG. 1 shows a dry pipe/deluge valve 100, in accordance with the present invention, having a body 110 with a main chamber 120 and a sensing chamber 130. The valve 100 may be formed, for example, of ductile iron, using a casting process. An input port 140 for a high pressure fluid supply line is provided at the bottom of the main chamber 120. The supply line connected to the input port 140 may have an inner diameter of, e.g., about 2 inches, and may provide fluid at a pressure of, e.g., up to about 250 psi. As discussed below, other sizes also are possible, such as, for example 2.5 inches, 3 inches, 76 mm, and 8 inches. A system output port 150, which is connected to a system of sprinkler conduits (not shown), is provided at the top of the main chamber 120. The output port 150 has a nominal diameter the same size as the supply input port 140. The main chamber 120 has an access panel, which is removed in this view to show the interior of the main chamber 120. A disk-shaped lid, referred to as a clapper 160, seals the input port 140 at the bottom of the main chamber 120.

Figure 2:
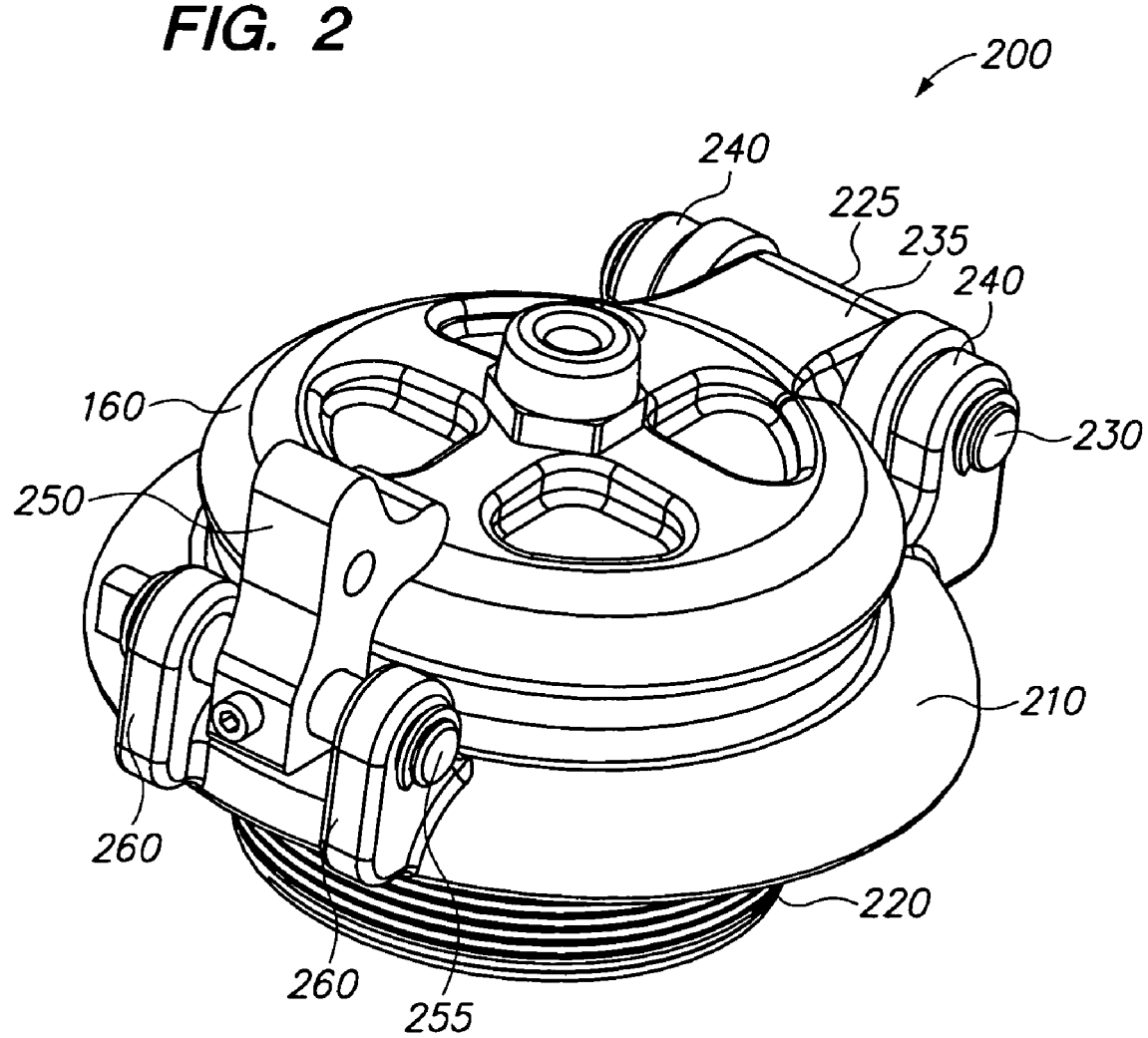
FIG. 2 is a perspective view of the clapper assembly.

The clapper 160 is part of a clapper assembly 200, as shown in FIG. 2, which includes an annular collar 210 and a threaded valve seat 220. The clapper assembly 200 is assembled outside of the valve body 110, inserted through the access panel, and then screwed into the bottom of the main chamber 120 of the valve body 110, as further described below. The clapper 160 is hinged to the collar 210 on one side, so that it can flip open (up and to the right, in the view of FIG. 1) to release the fluid in the supply line connected to the input port 140. The clapper hinge 225 includes a cylindrical rod 230 that extends through a rod housing portion 235 formed in the edge of the clapper 160. The rod 230 extends beyond the rod housing portion 235 at both ends and through support portions 240 extending from the collar 210. The edge of the clapper 160 opposite the hinge 225 is held in place with a releasable lever 250, as further described below. The lever 250 pivots about a rod 255 that extends through the lower portion of the lever 250 and into support portions of the collar 260 on both sides of the lever 250.

Figure 3A:
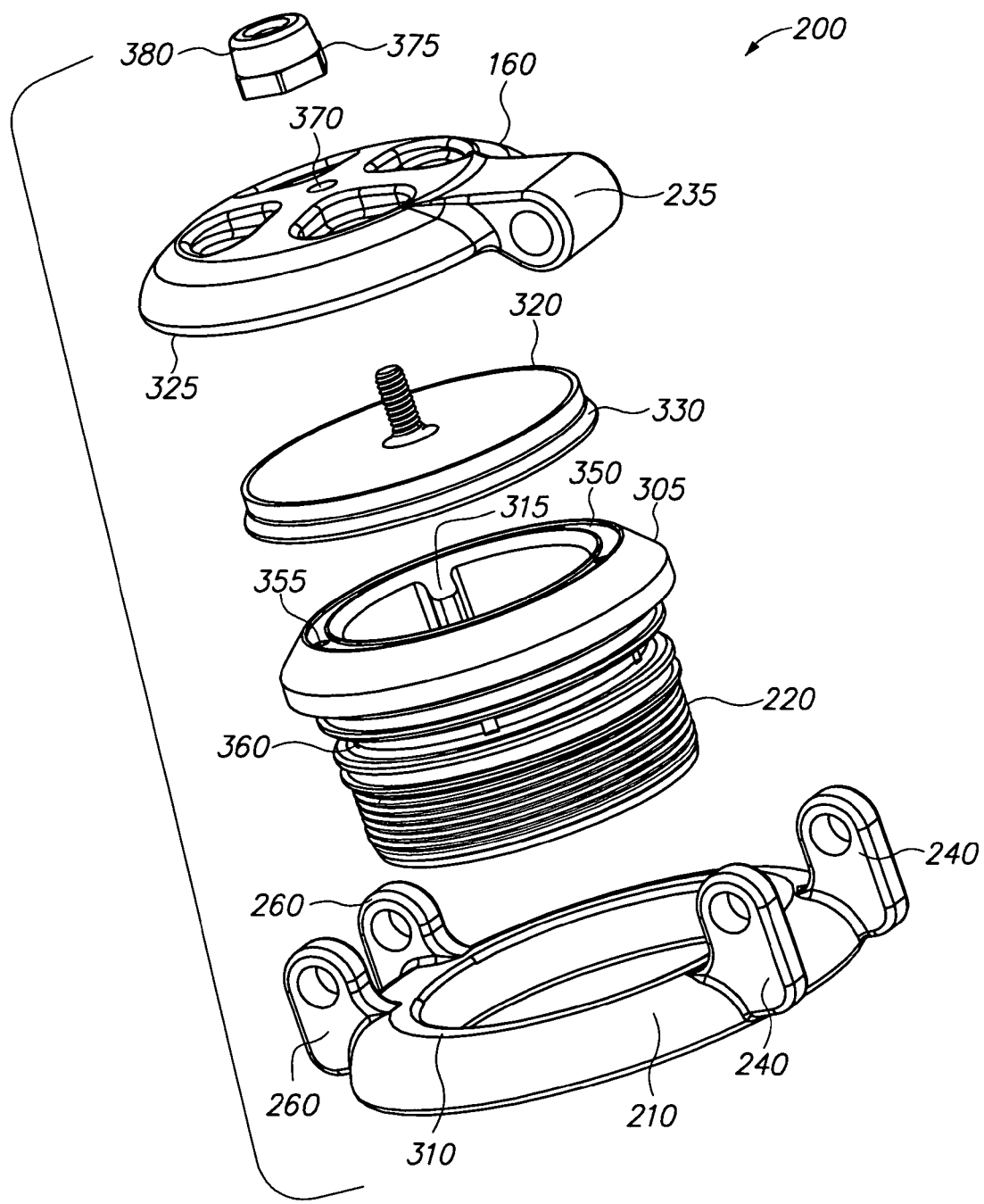
FIG. 3A is an exploded view of the clapper assembly.

FIG. 3A shows an exploded view of the clapper assembly 200. As noted above, the clapper 160 is connected to the collar 210 via a hinge 225, which can be assembled before the clapper assembly 200 is installed. The hinge between the lever 250 and the collar 210 can also be pre-assembled. The valve seat 220 fits into the collar 210 with a slip fit, so that the lip 305 on the upper edge of the valve seat 220 rests on an inner edge 310 of the collar 210. The valve seat 220 has protrusions 315 on the interior surface thereof that are configured to cooperate with an installation tool designed to be inserted into the valve seat 220 to screw the valve seat 220 into the bottom of the main chamber 120. The threaded portion of the valve seat 220 that installs into the valve body 110 may be about 0.75 inches in length and may have about 12 threads per inch. The components of the clapper assembly may be formed, for example, of brass, or preferably stainless steel, through a casting process, such as investment casting.

Due to the slip fit arrangement between the collar 210 and the valve seat 220, the clapper assembly 200 can be installed in the main chamber 120 of the valve body 110 without rotating the collar 210. This arrangement is advantageous in that it does not require clearance in the front and back of the main chamber 120 for the support portions 240 and 260 that extend from the collar 210, because the collar does not need to be rotated during assembly. This allows for a smaller main chamber 120 and a smaller overall valve body 110. The valve seat 220, when it is screwed into the valve body 110, holds the collar 210 in place. Stops 155 (see FIG. 1) are provided on the bottom inside surface of the main chamber 120 to prevent rotation of the collar 210 as the valve seat 220 is installed or uninstalled (only the front stop is illustrated; the other is located behind the collar, such that the support portions 240 are received between the stops 155). This arrangement is also advantageous over certain conventional valves that require the seat to be installed with pins, which require tight tolerances to ensure proper installation.

A sealing disk 320, shown in FIG. 3B, attaches to the inner surface 325 of the clapper 160, i.e., the surface facing the supply input line. The sealing disk 320 is metal, e.g., stainless steel, with a rubber seal 330 directly vulcanized onto the bottom surface of the disk 320. The rubber seal 330 includes a outer circumferential portion 335 that extends from the disk 320 and is configured to rest on an upper rim 350 of the valve seat 220 (see FIG. 3A). The circumferential portion 335 has two inclined edges 340 that form a trapezoidally-shaped, concave rim 345 around the disk 320. The upper rim 350 of the valve seat 220 forms a circumferential canal to capture water that may leak between the seal 330 and the valve seat 220 (see FIG. 3A). The upper rim 350 has a number of holes 355 around its periphery that lead through the interior of the walls of the valve seat 220 to alarm output ports 360 around the outer surface of the valve seat 220.

A threaded post 365 extends from the top of the sealing disk 320 (and may be cast as part of the disk or attached thereto by welding) to allow installation on the clapper 160. The post 365 is inserted through an opening 370 in the center of the clapper 160 and secured with a nut 375, which includes an upper portion 380 that acts as a bumper to absorb shock when the clapper 160 opens. In alternative embodiments, such as larger valve sizes, the sealing disk 320 may have more than one post 365. For example, for an 8-inch valve (i.e., a valve having 8-inch input and output ports), the sealing disk may have three posts arranged in a triangular configuration near the center of the disk. This configuration is advantageous over certain conventional designs in that it does not require holes to be tapped through the rubber seal 330 or the disk 320 in order to attach it to the clapper 160, which may lead to leakage.

Referring again to FIG. 1, the sensing chamber 130 is cylindrically-shaped and extends from the side of the main chamber 120 opposite the position of the clapper 160 hinge. The end of the sensing chamber has a removable cylindrical housing 170, which has a control fluid input port 175 on the bottom of the housing and a control fluid output port 180 on the top of the housing. The control output port 180 is connected to an actuator or a wet pilot line system (not shown). In operation, a loss in pressure in the pilot system, due to activation of an automatic sprinkler, releases fluid from the control output port 180, thereby initiating activation of the valve 100, as further described below.

Figure 4:
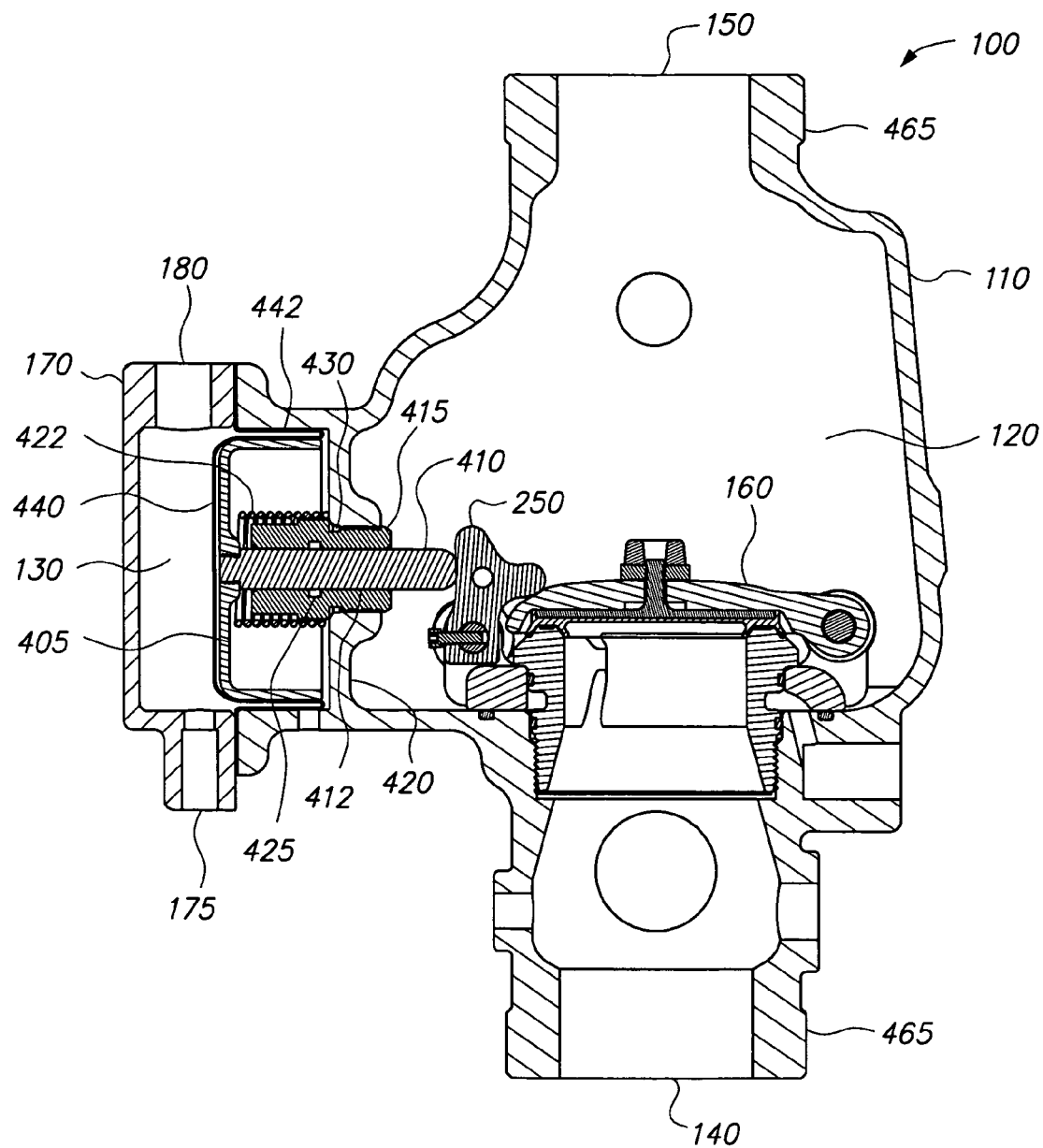
FIG. 4 is cross-sectional view of the dry pipe/deluge valve with the clapper in the closed position.

FIG. 4 is a cross-sectional view of valve body 110, showing the main 120 and sensing 130 chambers. As noted above, the edge of the clapper 160 opposite the hinge is held in place by a lever 250, which in turn is held in place by a piston 405 and push-rod 410 assembly that extends into the main chamber 120 from the sensing chamber 130. The push-rod 410 extends from the sensing chamber 130 into the main chamber 120 through the bore 412 of a threaded, cylindrical push-rod guide 415 that is screwed into the wall 420 between the chambers. The push-rod 410 may be about 3 inches in length and about 0.5 inches in diameter (for the embodiment having an input port size of between 2 and 3 inches). A spring 422 surrounds the push-rod guide 415 and is configured to exert force on the piston 405 in a direction away from the main chamber 120. The push-rod guide 415 has a circumferential groove 425 in the bore 412 to receive an o-ring to help seal the space between the push-rod 410 and the guide 415. There is also an o-ring groove 430 at the base of the threaded portion of the guide 415. The piston 405, push-rod 410, and spring 422 may all be formed, for example, of stainless steel. The push-rod guide 415 may be formed, for example, of plastic, and in particular a commercially available acetal resin, such as Delrin® (DuPont Corporation).

The sensing chamber 130 contains pressurized fluid, supplied through the control input port 175, in a volume between the head of the piston 405 and the walls of the sensing chamber 130. The pressure in the sensing chamber 130 acts to maintain the piston 405 in the unreleased position against the right side of the sensing chamber 130. The force of the fluid pressure against the piston 405 is countered by force supplied by the spring 422 and the force exerted by the lever 250 against the push-rod 410, due to the upward force on the clapper 160.

A diaphragm 440 is positioned to prevent fluid from passing from the sensing chamber 130, around the piston 405, and into the main chamber 120. The diaphragm 440 is a made from a thin piece of polymer material, e.g., Ethylene Propylene Diene Monomer (EPDM), of about 0.024 inches in thickness. The diaphragm 440 is positioned between and is held in place by the cooperation of the removable cylindrical housing 170 of the sensing chamber 130 and the valve body 110. When the sensing chamber 130 is filled with pressurized fluid, the diaphragm 440 covers the piston 405 head and the space 442 between the sides of the piston 405 and the walls of the sensing chamber 130: as can be seen in FIG. 4, the diaphragm 440 is folded into this space 442, and in fact lies in space 442 folded over itself. The folding of the diaphragm 440 around the sides of the piston 405 helps to ensure smooth operation of the piston 405, because the diaphragm 440 material slides against itself with relatively little friction as the piston moves to the released position.

As further shown in FIG. 4, the input 140 and output 150 ports of the main chamber 120 are cast to have thick portions at the ends thereof, with grooves 465 near the ends formed by machining. These end portions may have, for example, an internal diameter of about 2 inches and an external diameter of about 4 inches. The grooves may have an external diameter of about 3.5 inches. The end portions may be machined on the internal and external surface to form ports for desired standard pipe sizes, such as 2 inches, 2.5 inches, 76 mm, and 3 inches. For example, for a 2-inch port, the inside surface is left as-is and the outer surface is machined to reduce the external diameter by about an inch. Likewise, for a 3-inch port, the inside surface is machined to expand the diameter by about one inch, and the outside surface is machined just slightly to create a properly finished surface. This arrangement is advantageous in that a single mold can be used to cast at least four different valve sizes.

Figure 5:
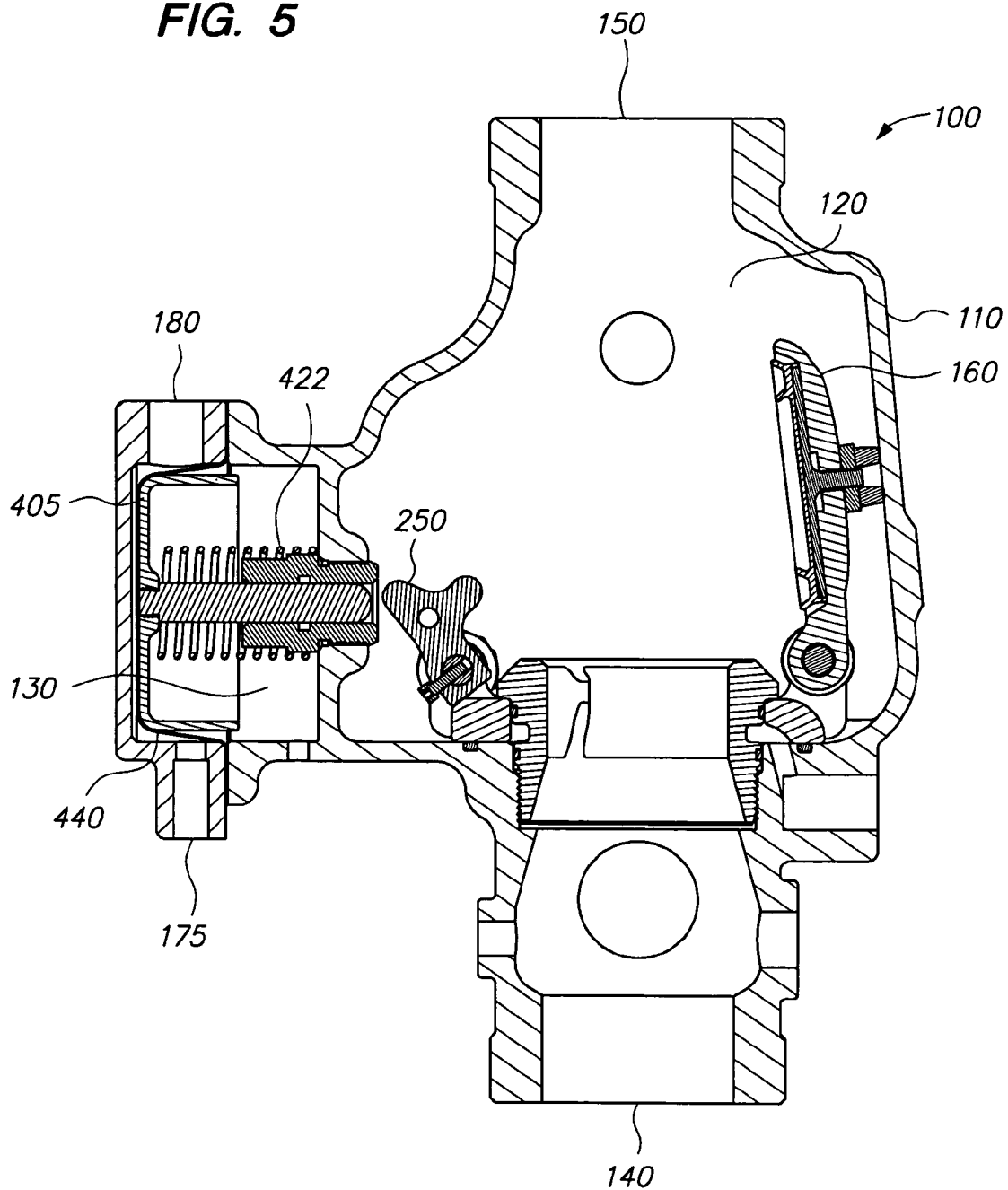
FIG. 5 is a cross-sectional view of the dry pipe/deluge valve with the clapper in the open position.

FIG. 5 shows a cross-sectional view of the valve 100 following activation, which is typically initiated by activation of an automatic sprinkler on the wet or dry pilot system connected to the control output 180 of the sensing chamber 130. In a dry pilot system, as discussed in the Background section, the activation of a pilot line sprinkler leads to a loss of air pressure in the pilot system, which in turn activates a pneumatic actuator (not shown). The actuator then opens a valve to release fluid from the control output 180 of the sensing chamber 130. The system may also have a hand-operated emergency switch (not shown) that releases the pressurized fluid from the sensing chamber 130. In certain systems, such as a pre-action system, activation of a solenoid valve by an electronic sensor, such as a smoke detector, may also be required to initiate activation.

The release of fluid in the pilot system directly or indirectly results in a drop in pressure in the sensing chamber 130. This, in turn, allows the piston 405 and push-rod 410 assembly to move into the sensing chamber 130 and the lever 250 to rotate away from the clapper 160, due to the spring 422 force and upward force on the clapper 160 (and the resulting force on the lever 250 and push-rod 410). Once the lever 250 has rotated sufficiently, the edge of the clapper 160 is released, and the clapper 160 flies open, thereby releasing fluid from the input port 140 into the main chamber 120 and into the sprinkler system connected to the valve output port 150.

Figure 6:
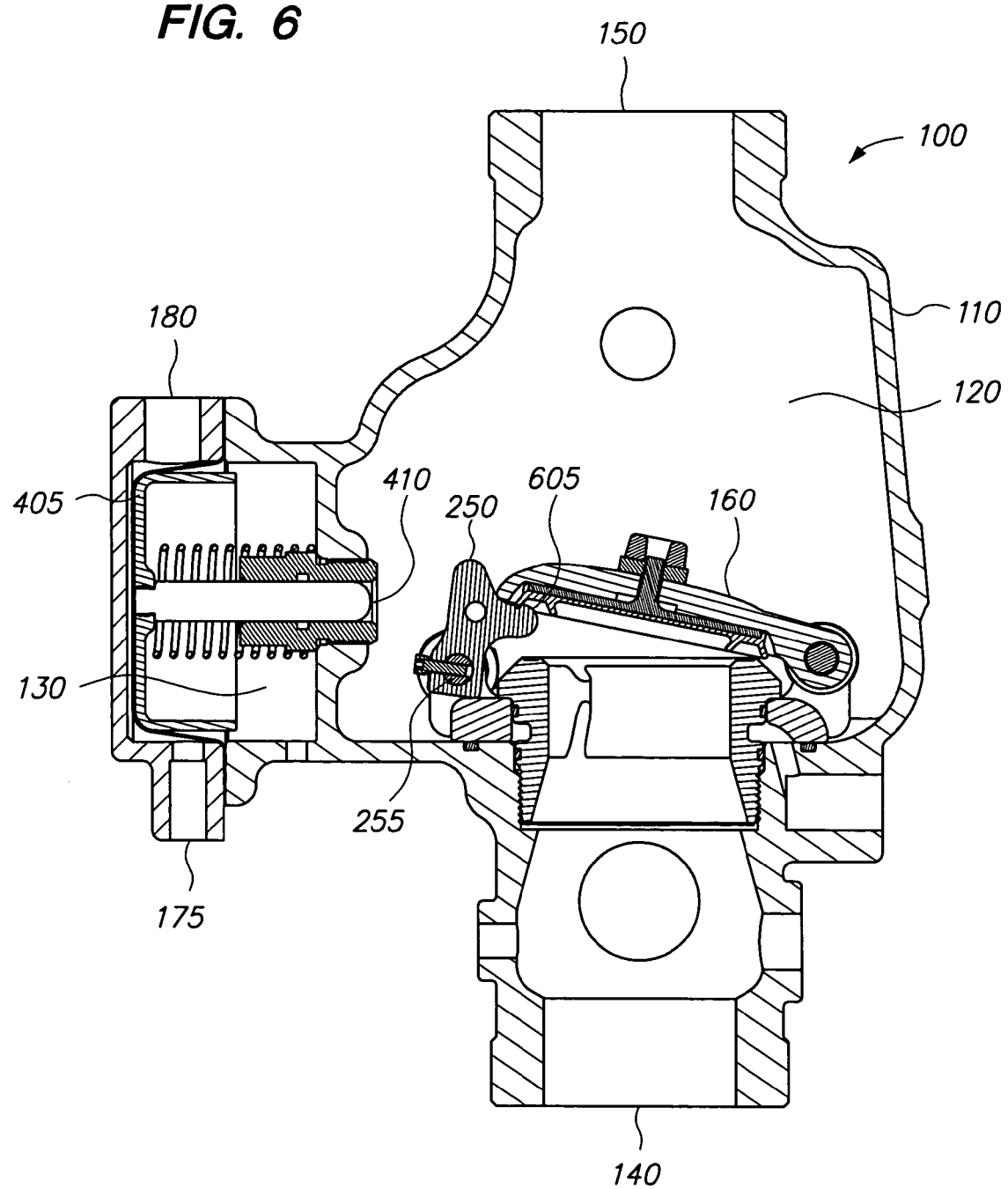
FIG. 6 is across-sectional view of the dry pipe/deluge valve with the clapper in the anti-reseat position

Referring to FIG. 6, following activation, fluctuations in the input supply pressure may allow the clapper 160 to fall back toward the closed position. To prevent the clapper 160 from closing completely in such an event, the lever 250 is provided with an extended portion 605, the weight of which tends to cause the lever 250 to rotate back toward the clapper 160 (i.e., clockwise in FIG. 6) after activation, thereby catching the edge of the clapper 160 and preventing it from closing (this is termed the "anti-reseat position" of the clapper 160). Alternatively, or in addition, a spring may be used to bias the lever 250 toward the clapper 160.

The valve 100 is reset by shutting off the input supply and rotating the lever 250 away from the clapper 160 using a reset knob (not shown), which rotates the rod 255 about which the lever 250 rotates, until the clapper 160 falls into the fully closed position. The reset knob is then released, which allows the lever 250 to rotate back into position over the edge of the clapper 160, due to the weight of the extended portion 605 of the lever 250. Pressure is then restored to the sensing chamber 130 to force the piston 405 and push-rod 410 assembly back into the unreleased position. At that point, the input supply may be restored.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims.

What is claimed is:

1. A valve for an automatic sprinkler system, the valve comprising:
    a main chamber having an input port for receiving fluid from a supply line and further having an output port;
    a clapper assembly installed in the main chamber for sealing the input port, the clapper assembly comprising:
        a threaded valve seat configured to be screwed into a wall of the main chamber, so as to be in communication with the input port;
        a collar configured to receive the valve seat therethrough, wherein the collar is separately positionable with respect to the valve seat and is held in position by the valve seat;
        a clapper configured to seal the input port, in cooperation with the valve seat, the clapper being hinged to the collar; and
        a lever hinged to the collar and movable between a first position in which the clapper is held closed by the lever and a second position in which the clapper is allowed to open; and
    a sensing chamber comprising components responsive to a control pressure of the sensing chamber, the components being in communication with the lever to move the lever between the first position and the second position.

2. The valve of claim 1, wherein the input port is sized to have a thicker portion at an end thereof to allow the valve to be machined to any pipe size selected from the group consisting of: 2 inches, 2.5 inches, 3 inches, and 76 mm.

3. The valve of claim 1, wherein the output port is sized to have a thicker portion at an end thereof to allow the valve to be machined to any pipe size selected from the group consisting of: 2 inches, 2.5 inches, 3 inches, and 76 mm.

4. The valve of claim 1, wherein the input port and the output port have a nominal size of 8 inches.

5. The valve of claim 1, wherein the sensing chamber comprises:
    a control input port for receiving fluid from a control supply;
    a control output port;
    a piston responsive to a fluid pressure in the sensing chamber; and
    a push-rod in communication with the piston, the push-rod extending into the main chamber and abutting the lever to hold the lever in the first position.

6. The valve of claim 5, wherein the sensing chamber further comprises a diaphragm positioned between the fluid in the sensing chamber and the piston.

7. The valve of claim 1, wherein the lever has an extended portion that tends to rotate the lever toward the clapper.

8. The valve of claim 7, wherein the extended portion of the lever, in the first position, contacts an upper edge of the clapper to prevent the clapper from opening.

9. The valve of claim 7, wherein the extended portion of the lever, in the first position, contacts a lower edge of the clapper to prevent the clapper from re-seating.

10. The valve of claim 1, wherein the clapper is hinged to the collar using a rod that extends through an edge of the clapper and through support portions that extend from the collar.

11. The valve of claim 1, wherein the collar forms a slip fit with the valve seat, such that an upper lip of the valve seat rests on a surface of the collar.

12. The valve of claim 1, wherein the valve seat comprises an upper rim having a circumferential canal.

13. The valve of claim 12, wherein the upper rim comprises a plurality of holes that lead through an interior of the valve seat to corresponding alarm output ports on an outer surface of the valve seat.

14. The valve of claim 1, wherein the clapper assembly further comprises a sealing disk removably attached to an underside of the clapper, so as to engage with the valve seat when the clapper is closed.

15. The valve of claim 14, wherein the sealing disk comprises a metal disk having a seal formed on a surface thereof and at least one threaded post extending from a central portion of an opposite surface.

16. The valve of claim 15, wherein the sealing disk comprises three threaded posts extending from the central portion of the surface opposite the seal surface.

17. The valve of claim 15, wherein the seal comprises a layer of rubber that is vulcanized to the metal disk.

18. The valve of claim 17, wherein the seal comprises a circumferential portion with edges that form a concave rim around the disk.

* * * * *